(12) United States Patent
Tokioka et al.

(10) Patent No.: US 7,753,800 B2
(45) Date of Patent: Jul. 13, 2010

(54) EXPANDABLE SHAFT

(75) Inventors: Ryouichi Tokioka, Osaka (JP); Mitsuharu Ozaki, Osaka (JP)

(73) Assignee: JTEKT Corporation, Osaka (JP)

( * ) Notice: Subject to any disclaimer, the term of this patent is extended or adjusted under 35 U.S.C. 154(b) by 946 days.

(21) Appl. No.: 10/590,570

(22) PCT Filed: Sep. 13, 2005

(86) PCT No.: PCT/JP2005/016831

§ 371 (c)(1),
(2), (4) Date: Aug. 24, 2006

(87) PCT Pub. No.: WO2006/030777

PCT Pub. Date: Mar. 23, 2006

(65) Prior Publication Data

US 2007/0163825 A1 Jul. 19, 2007

(30) Foreign Application Priority Data

Sep. 16, 2004 (JP) .............................. 2004-270148

(51) Int. Cl.
*F16C 3/03* (2006.01)
(52) U.S. Cl. ........................................ 464/167; 384/54
(58) Field of Classification Search ................ 464/167, 464/168; 384/49, 52, 54, 55
See application file for complete search history.

(56) References Cited

U.S. PATENT DOCUMENTS

| 3,834,183 A | 9/1974 | Muller et al. |
| 4,075,872 A | 2/1978 | Geisthoff et al. |
| 4,705,491 A | 11/1987 | Andersson |
| 4,898,566 A | 2/1990 | Hakansson et al. |
| 6,038,941 A * | 3/2000 | Hobaugh et al. ........ 464/167 X |
| 6,343,993 B1 | 2/2002 | Duval et al. |
| 7,341,525 B2 * | 3/2008 | Zernickel .................... 464/168 |
| 2002/0169026 A1 | 11/2002 | Cermak et al. |
| 2005/0257639 A1 | 11/2005 | Yamada |
| 2007/0157754 A1 | 7/2007 | Yamada |

FOREIGN PATENT DOCUMENTS

| DE | 3513340 | 10/1986 |
| DE | 3730393 | 3/1989 |
| DE | 20318654 | 4/2004 |
| EP | 1 065 397 A1 | 1/2001 |
| JP | 52-14161 | 2/1977 |
| JP | 57-4448 | 1/1982 |
| JP | 59-092256 | 5/1984 |

(Continued)

*Primary Examiner*—Greg Binda
(74) *Attorney, Agent, or Firm*—Rabin & Berdo, PC (57) ABSTRACT

An expandable shaft includes an outer shaft and an inner shaft. Plural rolling elements are pinched elastically in a space between raceway grooves of the outer shaft and the inner shaft. An outer peripheral surface of the inner shaft includes flat portions parallel to each other. An inner peripheral surface of the outer shaft includes flat limiting portions parallel to each other. The respective limiting portions limit relative rotation of the outer shaft and the inner shaft by engaging with corresponding flat portions. A deformation promoting portion is placed in a specific region of the outer shaft between a plane including a center of curvature of the raceway groove of the outer shaft as well as a central axis line of the outer shaft and each limiting portion.

5 Claims, 11 Drawing Sheets

FOREIGN PATENT DOCUMENTS

| | | |
|---|---|---|
| JP | 61-28918 | 2/1986 |
| JP | 61-211527 | 9/1986 |
| JP | 63-231010 | 9/1988 |
| JP | 3-62230 | 6/1991 |
| JP | 04-203623 | 7/1992 |
| JP | 2632892 | 4/1997 |
| JP | 2895216 | 3/1999 |
| JP | 2002-340007 | 11/2002 |
| JP | 2004-106599 | 4/2004 |
| WO | WO 2004/106758 A1 * | 12/2004 |
| WO | WO 2005/070744 | 8/2005 |

* cited by examiner

EXPANDABLE SHAFT

TECHNICAL FIELD

The present invention relates to an expandable shaft comprising an inner shaft and an outer shaft that are linked via rolling elements to allow relative movement in the axial direction and transmission of torque.

BACKGROUND ART

In a steering device of a vehicle, an intermediate shaft is provided between the steering shaft and the steering gear to transmit a rotary operating force applied to the steering wheel to the steering gear side.

Generally, the intermediate shaft adopts the ball spline structure in which plural balls aligned in arrays in the axial direction of the intermediate shaft are interposed in a space between corresponding raceway grooves formed in the inner shaft and in the tubular outer shaft.

Also, an expandable shaft that provides a preload to the rolling elements using an elastic restoring force of the tubular outer shaft has been proposed (for example, see German Unexamined Patent Publication No. 3730393A1, hereinafter "DE '393").

An expandable shaft that provides a preload to the rolling elements using elastic restoring forces of the outer shaft and the inner shaft by using hollow shafts as both the outer shaft and the inner shaft has been also proposed (for example, see German Utility Model No. 20318654U1).

In the DE '393 reference, a quantity of relative rotation of the inner shaft and the outer shaft is limited by allowing an angular protrusion formed on the outer peripheral surface of the inner shaft to engage with a semicircular concave portion formed on the inner peripheral surface of the outer shaft when high torque is applied.

In the method of allowing the angular protrusion to engage with the semicircular concave portion, however, irregularities of dimensional tolerance among respective components may possibly increase a quantity of relative rotation of the inner shaft and the outer shaft. In such a case, the elasticity of the outer shaft chiefly deteriorates with a long-term use, and the outer shaft may eventually become unable to provide a preload. The absence of a preload gives rise to play between the inner shaft and the outer shaft in the rotational direction, which possibly results in noise.

An object of the invention is therefore to provide an expandable shaft with excellent durability that hardly produces play with a long-term use.

DISCLOSURE OF THE INVENTION

In order to achieve the above object, a preferred aspect of the invention provides an expandable shaft including: an inner shaft having an outer peripheral surface; a tubular outer shaft having an inner peripheral surface and being fit over the inner shaft; at least one raceway groove formed on the outer peripheral surface of the inner shaft to extend longitudinally; at least one raceway groove formed on the inner peripheral surface of the outer shaft to oppose the raceway groove of the inner shaft; and plural rolling elements pinched elastically in a space between the raceway grooves of the inner shaft and the outer shaft by an elastic restoring force of the outer shaft.

The plural rolling elements are aligned in an array along a longitudinal direction of the raceway grooves. The outer peripheral surface of the inner shaft includes at least a pair of flat portions that are parallel to each other. The inner peripheral surface of the outer shaft includes at least a pair of flat limiting portions that are parallel to each other. The limiting portions limit a quantity of relative rotation of the inner shaft and the outer shaft by engaging, respectively, with the corresponding flat portions. The outer shaft includes a deformation promoting portion that promotes deformation of the outer shaft. The deformation promoting portion is placed in a specific region of the outer shaft in a circumferential direction. The specific region is a region between a plane including a center of curvature of the raceway groove of the outer shaft as well as a central axis line of the outer shaft and each limiting portion.

According to this aspect, when normal torque is applied, torque is transmitted between the inner shaft and the outer shaft via the rolling elements. When high torque is applied, a quantity of relative rotation of the inner shaft and the outer shaft is limited as the flat portions abut on the corresponding limiting portions. It is thus possible to forestall damages to the rolling elements and the raceway grooves.

Because a quantity of relative rotation of the inner shaft and the outer shaft is limited by using at least a pair of the opposing flat portions of the inner shaft, even when dimensional accuracy of the inner shaft and the outer shaft varies to some extent, a quantity of relative rotation of the inner shaft and the outer shaft is seldom increased excessively. Because the deformation promoting portion makes the outer shaft easy to bend, stress applied to the outer shaft and the rolling elements can be eased. It is thus possible to maintain a preload to the rolling elements over a long term, which in turn makes it possible to achieve an expandable shaft with excellent durability.

The deformation promoting portion may be a bending portion or a thin portion. When the deformation promoting portion is either the bending portion or the thin portion, deformation of the outer shaft can be promoted in a reliable manner with a simple configuration.

BEST MODE FOR CARRYING OUT THE INVENTION

Preferred embodiments of the invention will now be described with reference to the accompanying drawings.

Figure 1:
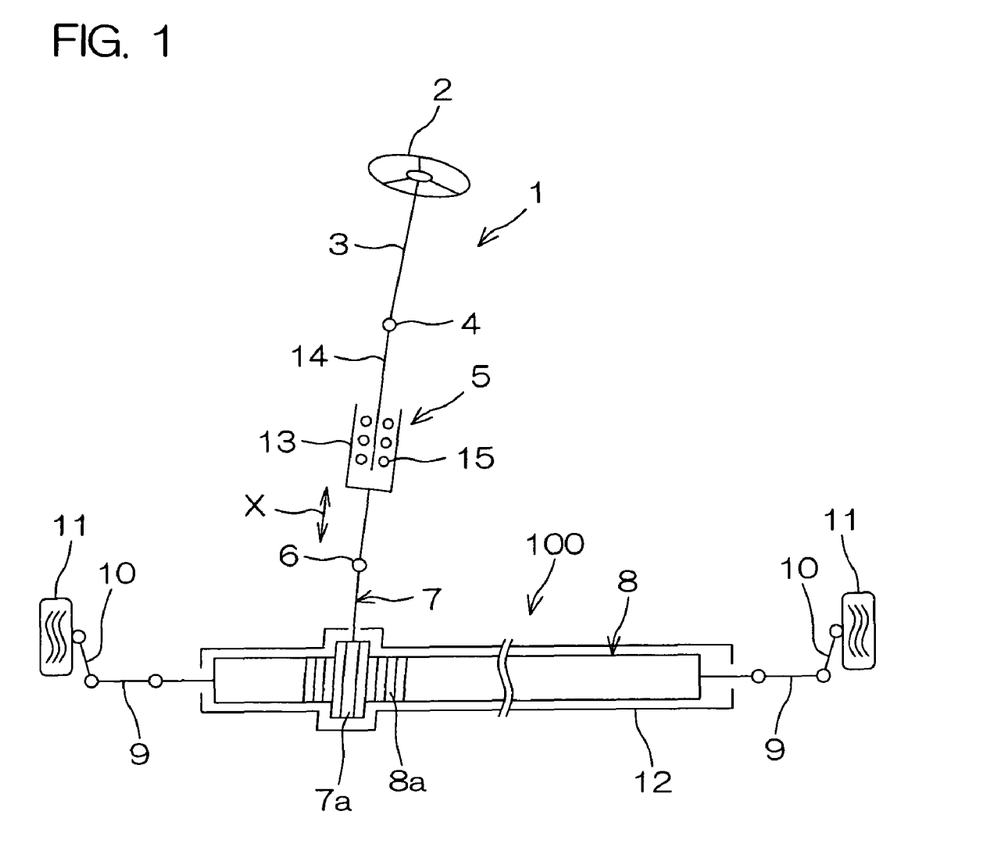
FIG. 1 is a schematic view of a steering device in which an expandable shaft according to one embodiment of the invention is used as an intermediate shaft.
Figure 2:
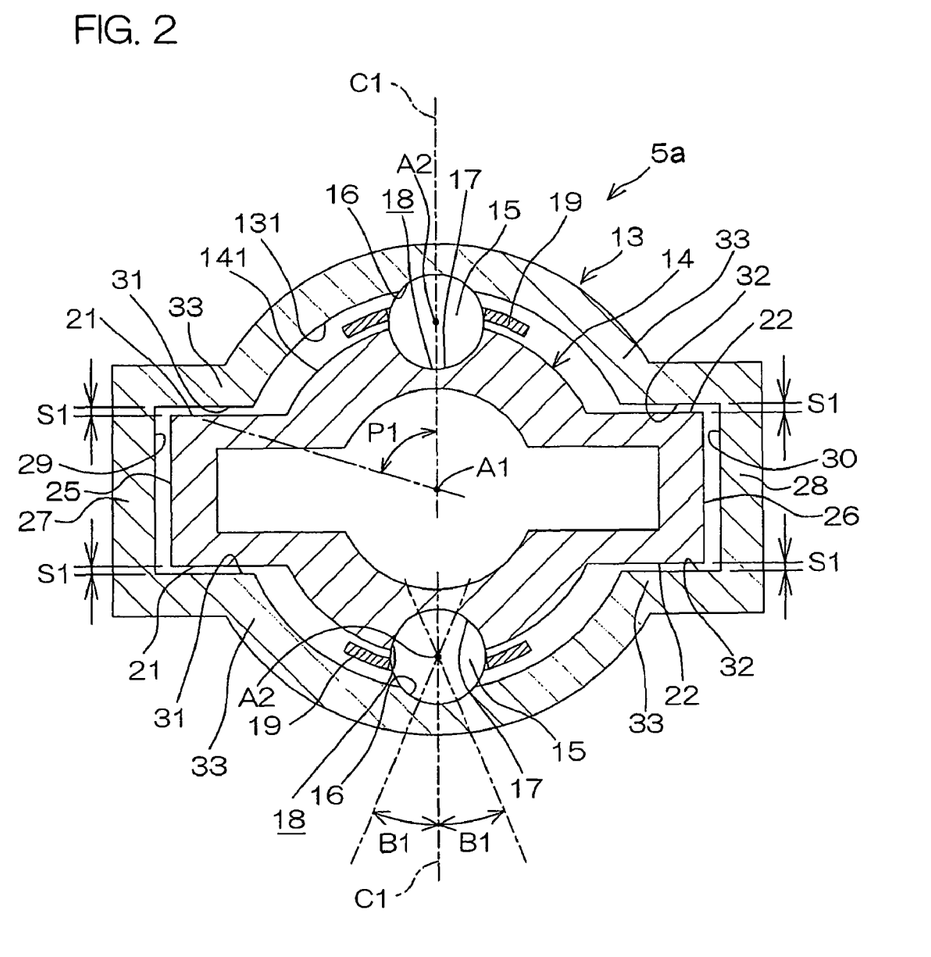
FIG. 2 is a cross section of the intermediate shaft as the expandable shaft.
Figure 3:
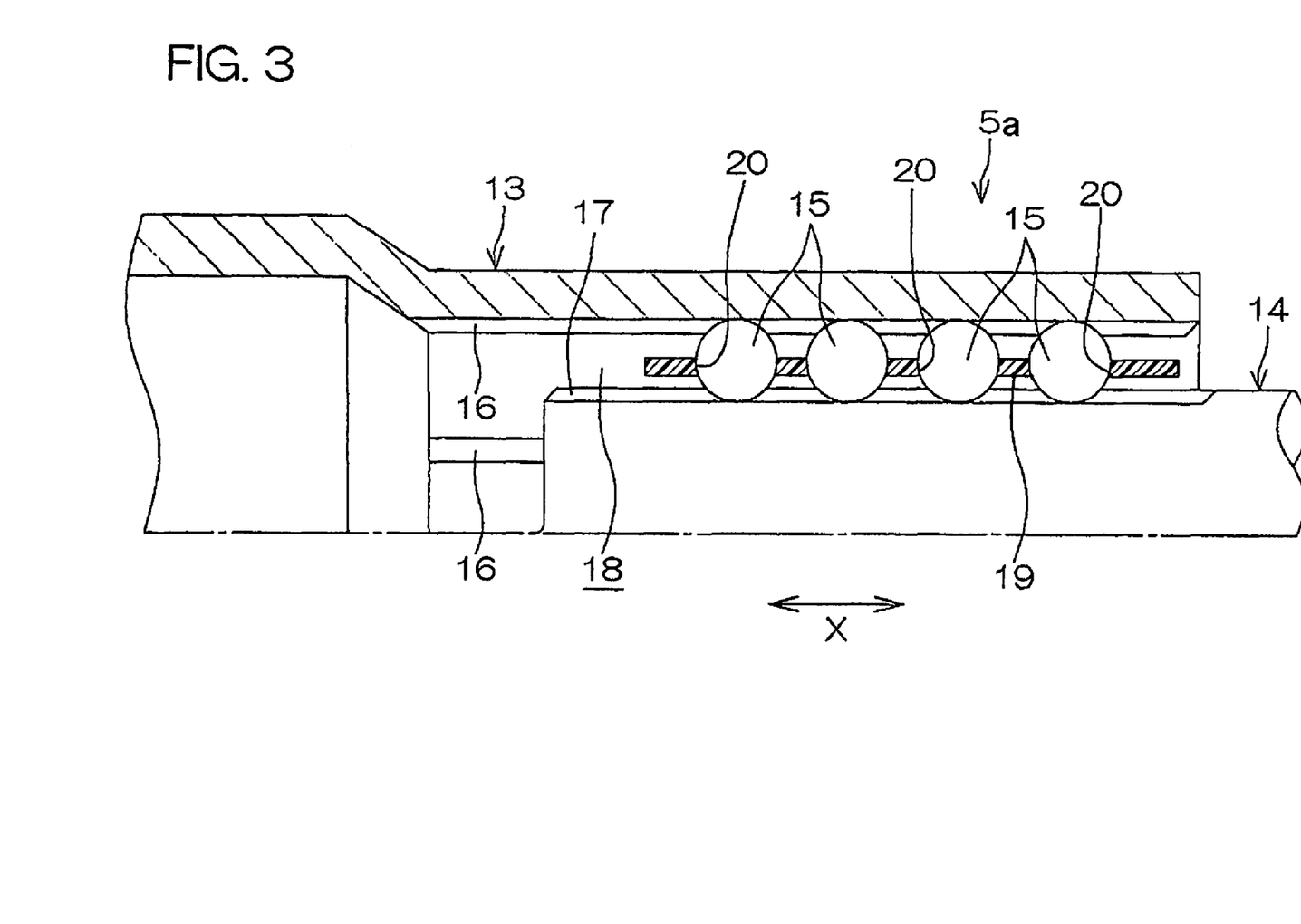
FIG. 3 is a cross section of the intermediate shaft as the expandable shaft.

FIG. 1 is a schematic view of a steering device in which an expandable shaft according to one embodiment of the invention is used as an intermediate shaft. FIG. 2 and FIG. 3 are cross sections of the expandable shaft.

Referring to FIG. 1, a steering device 1 includes a steering shaft 3 to which a steering member 2, such as a steering wheel, is fixed at one end, and an intermediate shaft 5 as an expandable shaft linked to the steering shaft 3 via a universal joint 4 so that they are allowed to rotate as one unit. Also, the steering device 1 includes a pinion shaft 7 linked to the intermediate shaft 5 via a universal joint 6 so that they are allowed to rotate as one unit, and a rack shaft 8 extending in the crosswise direction of the vehicle and having a rack 8a that meshes with a pinion 7a provided on the pinion shaft 7.

Tie rods 9 are coupled to a pair of end portions of the rack shaft 8. Each tie rod 9 is linked to a corresponding steering control wheel 11 via a corresponding knuckle arm 10.

The rack shaft 8 is supported on a housing 12 via an unillustrated bearing to be free to move in the axial direction. The pinion shaft 7, the rack shaft 8, the tie rods 9, the steering knuckle arms 10, and the steering control wheels 11 together form a steering mechanism 100.

When the steering member 2 is manipulated and the steering shaft 3 starts to rotate, the rotation is converted to linear motions of the rack shaft 8 along the crosswise direction of the vehicle by the pinion 7a and the rack 8a. The steering control wheels 11 can be thus steered.

The intermediate shaft 5 as the expandable shaft includes a tubular outer shaft 13, and an inner shaft 14 fitted in the outer shaft 13. The outer shaft 13 and the inner shaft 14 are connected to each other via balls 15 as rolling elements aligned in plural arrays to allow relative movement in the axial direction X and transmission of torque.

Referring to FIG. 2 and FIG. 3, raceway grooves 16 and 17 both extending in the axial direction are formed, respectively, on the inner peripheral surface 131 of the outer shaft 13 and the outer peripheral surface 141 of the inner shaft 14. The raceway grooves 16 of the outer shaft 13 and the raceway grooves 17 of the inner shaft 14 are of equal numbers (both are provided in a pair in this embodiment) and placed oppositely at equal intervals in the circumferential direction. Raceway channels 18 are defined between the opposing raceway grooves 16 and 17 of the outer shaft 13 and the inner shaft 14, respectively. The balls 15 aligned in an array along the axial direction X (a direction in which the raceway grooves 16 and 17 extend) are interposed in each raceway channel 18. The cross sections of the respective raceway grooves 16 and 17 are circular arcs having a radius slightly larger than the radius of the balls 15. As is shown in FIG. 2, for the balls 15, an angle of contact, B1, is set in a range from 5 to 40 degrees.

The balls 15 in each array are held collectively in the corresponding raceway channel 18 by means of a common holder 19. As is shown in FIG. 3, the holder 19 comprises a long plate member made of, for example, synthetic resin, that has an arc-shaped cross section and extends along the axial direction X. The holder 19 is provided with holding holes 20 for the balls 15 made in line at regular intervals along the longitudinal direction.

Referring to FIG. 2 again, the inner shaft 14 comprises a hollow shaft, that is, a tube. Two pairs of flat portions 21 and 22 that oppose each other and form a width across flat in between are formed on the outer peripheral surface 141 of the inner shaft 14. Limiting portions 31 and 32 for limiting a quantity of relative rotation of the outer shaft 13 and the inner shaft 14 by engaging with the corresponding flat portions 21 and 22 of the inner shaft 14 are formed on the inner peripheral surface 131 of the outer shaft 13.

A pair of protrusions 25 and 26 that have square cross sections and oppose each other while protruding outward in the radius direction is formed on the outer peripheral surface 141 of the inner shaft 14. A direction in which the balls 15 in a pair oppose each other and a direction in which the protrusions 25 and 26 in a pair oppose each other intersect with each other at right angles. The protrusion 25 includes the pair of flat portions 21 and 21 opposing each other on the outer surface thereof, and the other protrusion 26 includes the pair of flat portions 22 and 22 opposing each other on the outer surface thereof.

In addition, the outer shaft 13 is of a similar figure to the inner shaft 14. The outer shaft 13 is provided with a pair of protrusions 27 and 28 protruding outward in the radius direction at positions corresponding to the protrusions 25 and 26 of the inner shaft 14, respectively. The outer shaft 13 thus defines concave portions 29 and 30 on the inner side of the protrusions 27 and 28 to accommodate the corresponding protrusions 25 and 26 of the inner shaft.

The limiting portions 31 and 31 comprising a pair of flat portions that are parallel to each other are formed on the inner surface of the concave portion 29. Each limiting portion 31 opposes the corresponding flat portion 21. Also, the limiting portions 32 and 32 comprising a pair of flat portions that are parallel to each other are formed on the inner surface of the concave portion 30. Each limiting portion 32 opposes the corresponding flat portion 22.

The outer shaft 13 forms bending portions 33, which serve as deformation promoting portions, between the terminal end portions of the respective protrusions 27 and 28 and the remaining arc-shaped portions of the outer shaft 13. More specifically, the bending portions 33 serving as the deformation promoting portions that promote deformation of the outer shaft 13 are formed in regions between respective planes C1 including the central axis line A1 of the outer shaft 13 as well as the centers of curvature A2 of the respective raceway grooves 16 of the outer shaft 13 and the limiting portions 31 and 32 adjacent to the respective raceway grooves 16. The bending portions 33 are provided in the terminal end portions of the protrusions 27 and 28 of the outer shaft 13.

According to this embodiment, when normal torque is applied, torque is transmitted between the inner shaft 14 and the outer shaft 13 via the balls 15. On the other hand, when high torque is applied, a quantity of relative rotation of the inner shaft 14 and the outer shaft 13 is limited as either one of the flat portions 21 and 22 in each pair of the inner shaft 14 abuts on the corresponding limiting portion 31 or 32 of the outer shaft 13. It is thus possible to forestall damages to the balls 15 and the raceway grooves 16 and 17.

Because a pair of flat portion 21 and 22 that form the width across flat in between is used, even when the dimensional accuracy of the inner shaft 14 and the outer shaft 13 varies to some extent, a quantity of relative rotation of the inner shaft 14 and the outer shaft 13 is seldom increased.

In addition, because the bending portions 33 serving as the deformation promoting portions are provided between the respective planes C1 including the central axis line A1 of the outer shaft 13 as well as the centers of curvature A2 of the respective raceway grooves 16 of the outer shaft 13 and the limiting portions 31 and 32 adjacent to the respective raceway grooves 16, the outer shaft 13 can be made easy to bend. Stress applied to the outer shaft 13 and the balls 15 can be therefore eased. It is thus possible to maintain a preload to the balls 15 over a long period, which in turn makes it possible to achieve the intermediate shaft 5 as an expandable shaft with excellent durability.

Also, deformation of the outer shaft 13 can be promoted in a reliable manner with a simple configuration using the bending portions 33 as the deformation promoting portions.

It is preferable that the diameter of the balls 15 is in a range from 10 to 40% of the outside diameter of the outer shaft 13. More specifically, when the diameter of the balls 15 is less than 10% of the outside diameter of the outer shaft 13, impression may occur on the balls 15 and the raceway grooves 16 and 17. On the contrary, when the diameter of the balls 15 exceeds 40% of the outside diameter of the outside shaft 13, the outer shaft 13 is increased in size, which increases the intermediate shaft 5a as the expandable shaft in size. When the inner shaft 14 is reduced in size without changing the outer diameter of the outer shaft 13 to avoid an increase in size, the inner shaft 14 has an insufficient strength and the radius of contact of the inner raceway groove is reduced, which in turn readily gives rise to impression.

Hence, by setting the diameter of the balls in a range from 10 to 40% of the outside diameter of the outer shaft 13, it is possible to reduce the intermediate shaft 5 in size while preventing the occurrence of impression on the raceway grooves 16 and 17 or the like. For example, given 30 mm as the outside diameter of the outer shaft 13, then it is preferable to set the diameter of the balls 15 in a range from 3 to 12 mm.

It is preferable that the angle of contact of the balls 15 is 5 to 40 degrees. When the angle of contact of the balls is less than 5 degrees, backlash of the balls 15 is increased. On the other hand, when the angle of contact exceeds 40 degrees, it becomes difficult for the two pairs of the flat portions 21 and 22 of the inner shaft 14 to abut on the corresponding limiting portions 31 and 32 of the outer shaft. Hence, by setting the angle of contact, B1, of the balls 15 to 5 to 40 degrees, it is possible to set a quantity of relative rotation of the inner shaft 14 and the outer shaft 13 under application of high torque to the necessary magnitude while reducing the backlash.

When spaces S1 formed, respectively, between the limiting portions 31 and 32 and the corresponding flat portions 21 and 22 are equal, it is preferable that a quantity of each space S1 is 0.01 to 0.5 mm. When the space S1 is less than 0.01 mm, the limiting portions 31 and 32 may possibly operate during transmission of normal torque. On the contrary, when the space S1 exceeds 0.5 mm, a quantity of relative rotation of the outer shaft 13 and the inner shaft 14 becomes excessively large. Hence, by setting the space S1 to a range from 0.01 to 0.5 mm, a quantity of relative rotation can be set to fall within a necessary range.

It is preferable to set the thickness of the outer shaft 13 in a range from 5 to 15% of the outside diameter of the outer shaft 13. When the thickness is less than 5% of the outside diameter of the outer shaft 13, an insufficient strength is concerned. On the contrary, when the thickness exceeds 15% of the outside diameter of the outer shaft 13, it is difficult to secure the bending of the outer shaft 13. Hence, by setting the thickness of the outer shaft 13 in a range from 5 to 15% of the outside diameter of the outer shaft 13, the outer shaft 13 can be made easy to bend while ensuring the strength of the outer shaft 13. For example, given 30 mm as the outside diameter of the outer shaft 13, it is preferable to set the thickness of the outer shaft 13 in a range from 1.5 to 4.5 mm.

It is preferable that a central angle P1 of the outer shaft 13, which corresponds to respective regions between the respective planes C1 including the central axis line A1 of the outer shaft 13 as well as the centers of curvature A2 of the respective raceway grooves 16 and the limiting portions 31 and 32 adjacent to the respective raceway grooves 16, is in a range from 30 degrees to 60 degrees. The central angle P1 is equivalent to a phase difference between the planes C1 and the corresponding limiting portions 31 and 32.

When the central angle P1 is less than 30 degrees, stress acting in the vicinity of the raceway grooves 16 in addition to stress acting on the limiting portions becomes large, which causes a problem that plastic deformation readily occurs. On the contrary, when the central angle P1 exceeds 60 degrees, stress acting on the protrusions 27 and 28 in addition to stress acting on the limiting portions become large, which causes a problem that plastic deformation readily occurs. The central angle P1 is therefore set in a range from 30 to 60 degrees. A range from 40 to 50 degrees is more preferable for the central angle P1.

Likewise, it is preferable that the central angle of the outer shaft, which corresponds to a region between each plane C1 and the corresponding bending portion 33, is in a range from 30 to 60 degrees. When the central angle is less than 30 degrees, stress acting in the vicinity of the raceway grooves 16 in addition to stress acting on the limiting portions becomes large, which causes a problem that plastic deformation readily occurs. On the contrary, when the central angle exceeds 60 degrees, stress acting on the protrusions 17 and 18 in addition to stress acting on the limiting portions becomes large, which causes a problem that plastic deformation readily occurs. The central angle is therefore set in a range from 30 to 60 degrees. A range from 40 to 50 degrees is even preferable for the central angle.

In this embodiment, the balls 15 and the flat portions 21 and 22 as well as the limiting portions 31 and 32 are placed on the same cross section. However, it goes without saying that the same advantages can be achieved when they are not placed on the same cross section.

Figure 4:
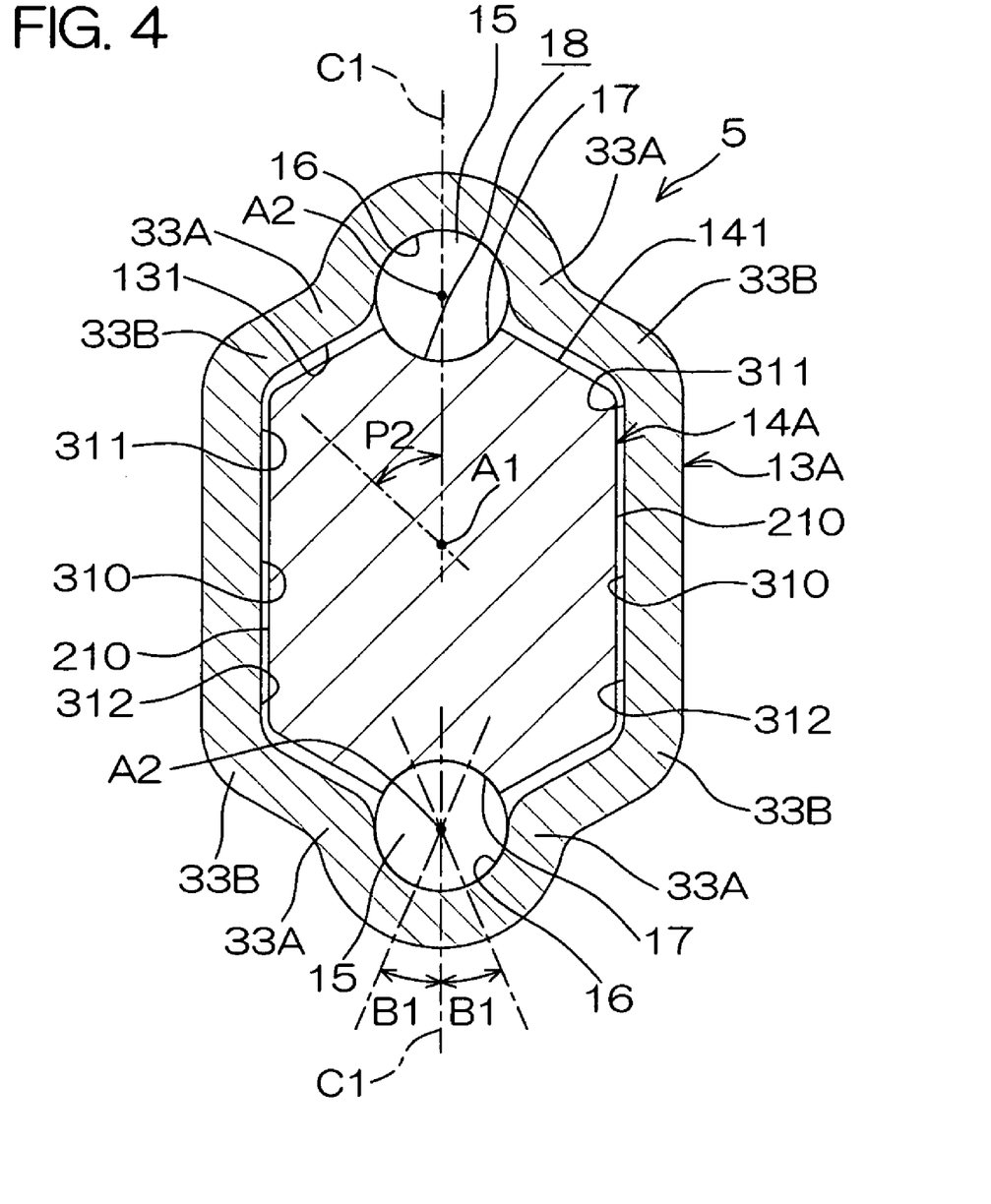
FIG. 4 is a cross section of an expandable shaft according to another embodiment of the invention.

Next, FIG. 4 shows another embodiment of the invention. Referring to FIG. 4, in this embodiment, a pair of flat portions 210 and 210 that form a width across flat in between is formed on the outer peripheral surface 141 of a solid inner shaft 14A. Flat portions 310 and 310 opposing the respective flat portions 210 and 210 are formed on the inner peripheral surface 131 of a tubular outer shaft 13A. On each flat portion 310, a limiting portion 311 is formed at one end in the longitudinal direction and a limiting portion 312 is formed at the other end.

A pair of bending portions 33A and 33B that bend oppositely is formed in each of regions between respective planes C1 including the central axis line A1 of the outer shaft 13A as well as the centers of curvature A2 of the respective raceway grooves 16 and the adjacent limiting portions 311 and 312 in such a manner that the respective pairs are spaced apart in a circumferential direction of the outer shaft 13A. In short, the pair of bending portions 33A and 33B shape a waveform.

The same functions and advantages as those of the embodiment of FIG. 2 can be achieved in this embodiment, too. To be more specific, even when the dimensional accuracy of the inner shaft 14A and the outer shaft 13A varies to some extent, a quantity of relative rotation of the inner shaft 14A and the outer shaft 13A is seldom increased.

Because the pair of bending portions 33A and 33B that server as the deformation promoting portions and shape a waveform are provided in each of the regions between the respective planes C1 including the central axis line A1 of the outer shaft 13A as well as the centers of curvature A2 of the respective raceway grooves 16 and the limiting portions 311 and 312 adjacent to the respective raceway grooves 16, the outer shaft 13A can be made easy to bend. Stress applied to the outer shaft 13A and the balls 15 can be therefore eased. It is thus possible to maintain a preload to the balls 15 over a long period, which in turn makes it possible to achieve the intermediate shaft 5 as an expandable shaft with excellent durability. Also, deformation of the outer shaft 13A can be promoted in a reliable manner with the simple configuration using the bending portions 33A and 33B as the deformation promoting portions.

Figure 5:
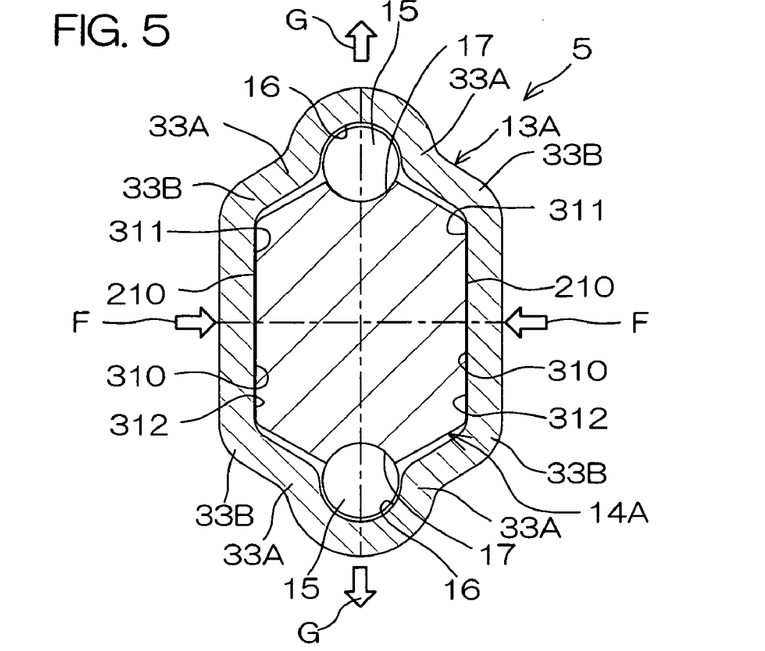
FIG. 5 is a view used to describe a manner in which balls are incorporated into the expandable shaft.

Further, during assembly, as is shown in FIG. 5, by pinching a pair of the flat portions 310 and 310 of the outer shaft 13A by applying a force F from the outside, it is possible to expand the raceway grooves 16 of the outer shaft 13A outward (see arrows G). This makes it easy to incorporate the balls 15 into spaces between the raceway grooves 16 and 17 during assembly.

In addition, it is preferable that a central angle P2 of the outer shaft 13A, which corresponds to respective regions between the respective planes C1 including the central axis line A1 of the outer shaft 13A as well as the centers of curvature A2 of the respective raceway grooves 16 and the limiting portions 311 and 312 adjacent to the respective raceway grooves 16, is in a range from 30 to 60 degrees. When the central angle P2 is less than 30 degrees, stress acting in the vicinity of the raceway grooves 16 in addition to stress acting on the limiting portions becomes large, which causes a problem that plastic deformation readily occurs. On the contrary, when the central angle P2 exceeds 60 degrees, stress acting on the protrusions 27 and 28 in addition to stress acting on the limiting portions becomes large, which causes a problem that plastic deformation readily occurs. The central angle P2 is therefore set in a range from 30 to 60 degrees. A range from 40 to 50 degrees is more preferable for the central angle P2.

A central angle of the outer shaft 13A, which corresponds to a region between each plane C1 and the bending portion 33B on the remote side from the plane C1, is preferably in a range from 30 to 60 degrees. When the central angle is less than 30 degrees, stress acting in the vicinity of the raceway grooves 16 in addition to stress acting on the limiting portions becomes large, which causes a problem that plastic deformation readily occurs. On the contrary, when the central angle exceeds 60 degrees, stress acting on the protrusions 27 and 28 in addition to stress acting on the limiting portions becomes large, which causes a problem that plastic deformation readily occurs. The central angle is therefore set in a range from 30 to 60 degrees. A range from 40 to 50 degrees is even preferable for the central angle.

In the embodiment shown in FIG. 4, a hollow shaft, that is, a tube, may be used as the inner shaft 14A.

Figure 6:
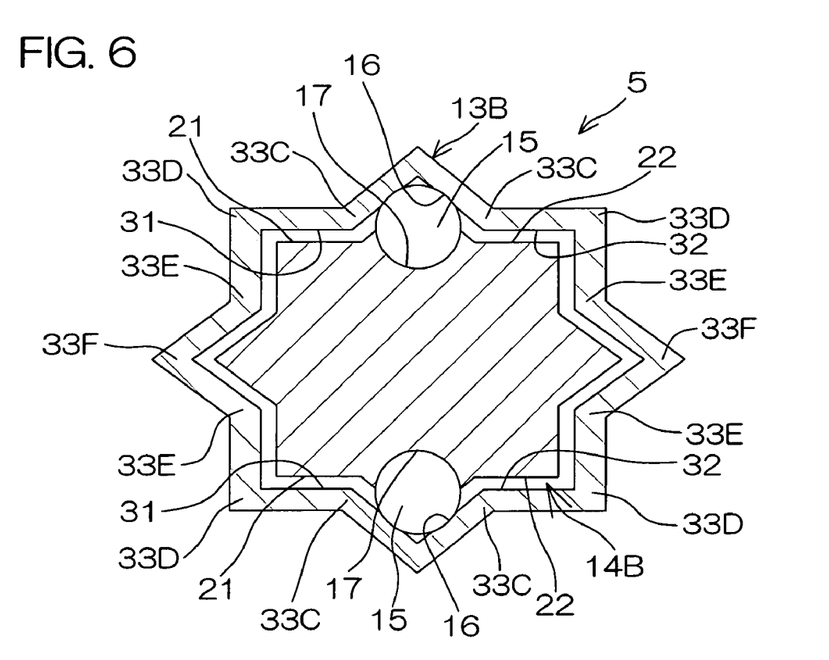
FIG. 6 is a cross section of an expandable shaft according to a further embodiment of the invention.

Next, FIG. 6 shows a further embodiment of the invention. Referring to FIG. 6, a star-shaped, tubular outer shaft 13B and a star-shaped inner shaft 14B of a similar figure are used in this embodiment. In this embodiment, because bending portions 33C to 33F are distributed along the entire periphery of the outer shaft 13B and placed to bend in opposite directions alternately, the outer shaft 13B can be made easier to bend. In this embodiment, a hollow shaft may be used as the inner shaft 14B.

Also, because the central angle P2 of the outer shaft 13B, which corresponds to respective regions between the respective planes C1 and the limiting portions 311 and 312, is in a region of 30 to 60 degrees, the limiting portions 311 and 312 readily function as stoppers. It is preferable to limit relative rotation of the outer shaft 13B and the inner shaft 14B actively at this position.

Figure 7:
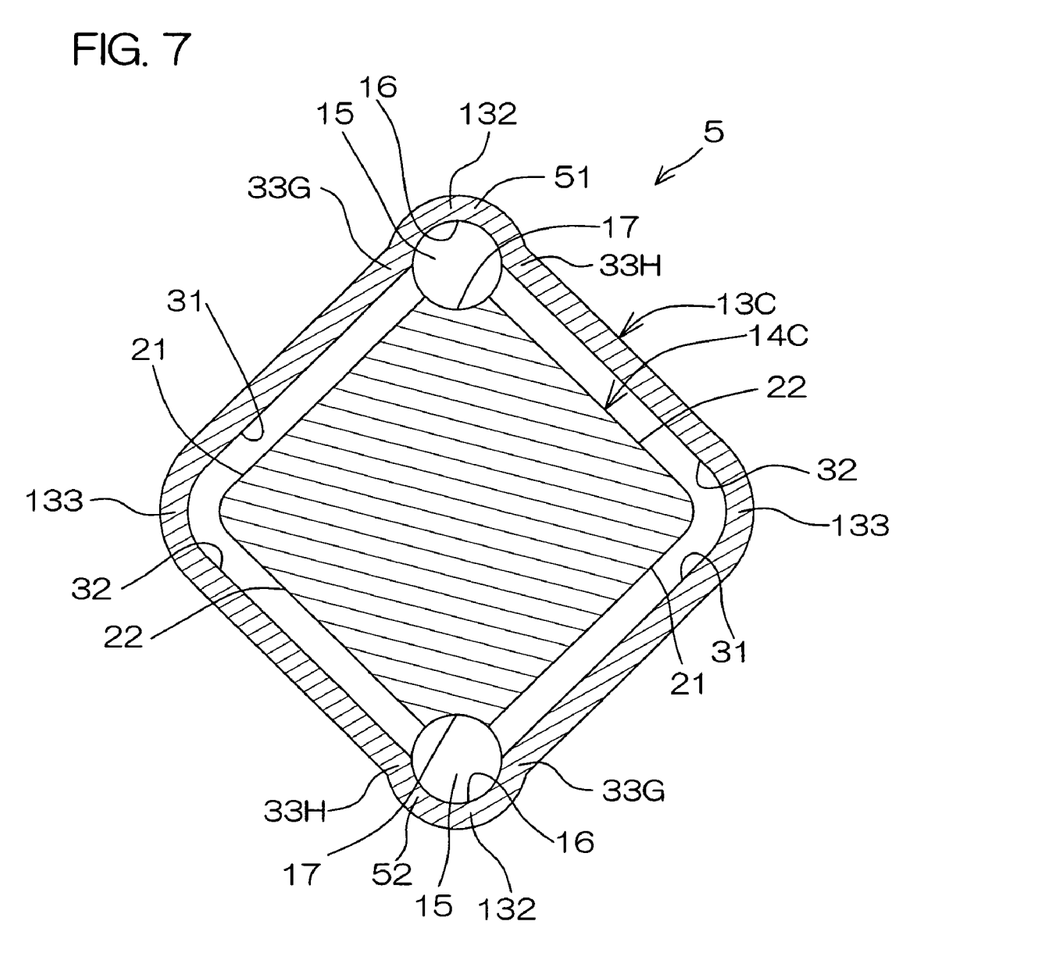
FIG. 7 is a cross section of an expandable shaft according to still another embodiment of the invention.

Next, FIG. 7 shows still another embodiment of the invention. Referring to FIG. 7, the characteristic of this embodiment is that an outer shaft 13C comprises a square tube, and an inner shaft 14C comprises a square solid shaft of a similar figure. Raceway grooves 16 for the balls 15 are formed at a pair of opposing corners 132 and 132 of the square of the outer shaft 13C. The corners 132 and 132 are provided, respectively, with angular protrusions 51 and 52 protruding outward in the radius direction that are formed to bulge using original R-shaped portions of the corners 132 and 132. Bending portions 33G and 33H as deformation promoting portions are provided in the terminal end portions of the respective protrusions 51 and 52.

According to this embodiment, the outer shaft 13C provided with the raceway grooves 16 can be manufactured readily at a low cost using a square tube as a material. Moreover, the respective sides of the square tube can be used directly as the limiting portions 31 and 32 corresponding to the pair of flat portions 21 and 22 that form the width across flat of the inner shaft 14C. This can also save the manufacturing costs. The limiting portions 31 and 32 are placed in the vicinity of the corners 133 and 133 where the balls 15 are absent.

Figure 8:
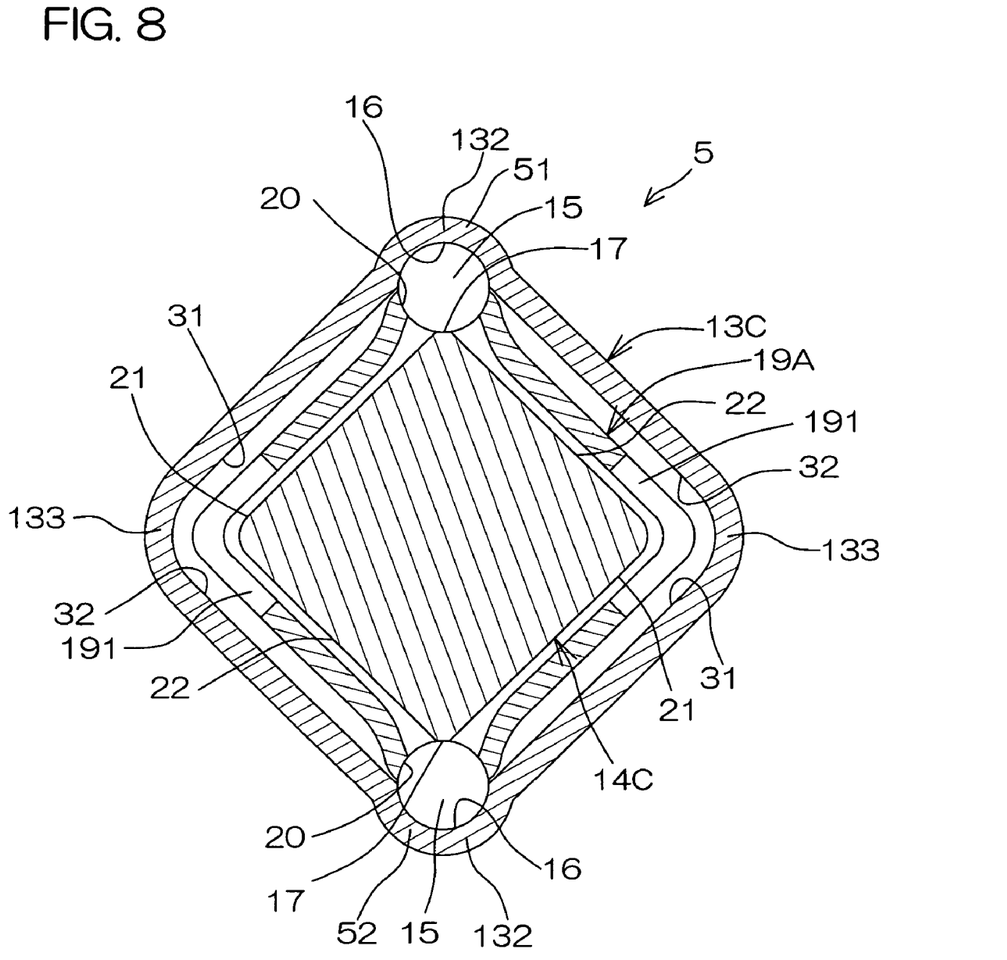
FIG. 8 is a cross section of an expandable shaft according to still another embodiment of the invention.

As is shown in FIG. 8, a square tubular holder surrounding the inner shaft 14C can be used as a holder 19A. In this case, the holder 19A is provided with openings 191 to correspond to regions including the corners 133 in which the limiting portions 31 and 32 are provided. In this case, because the balls 15 in each array can be incorporated at a time using the tubular holder 19A, the assembly performance can be enhanced.

Figure 9:
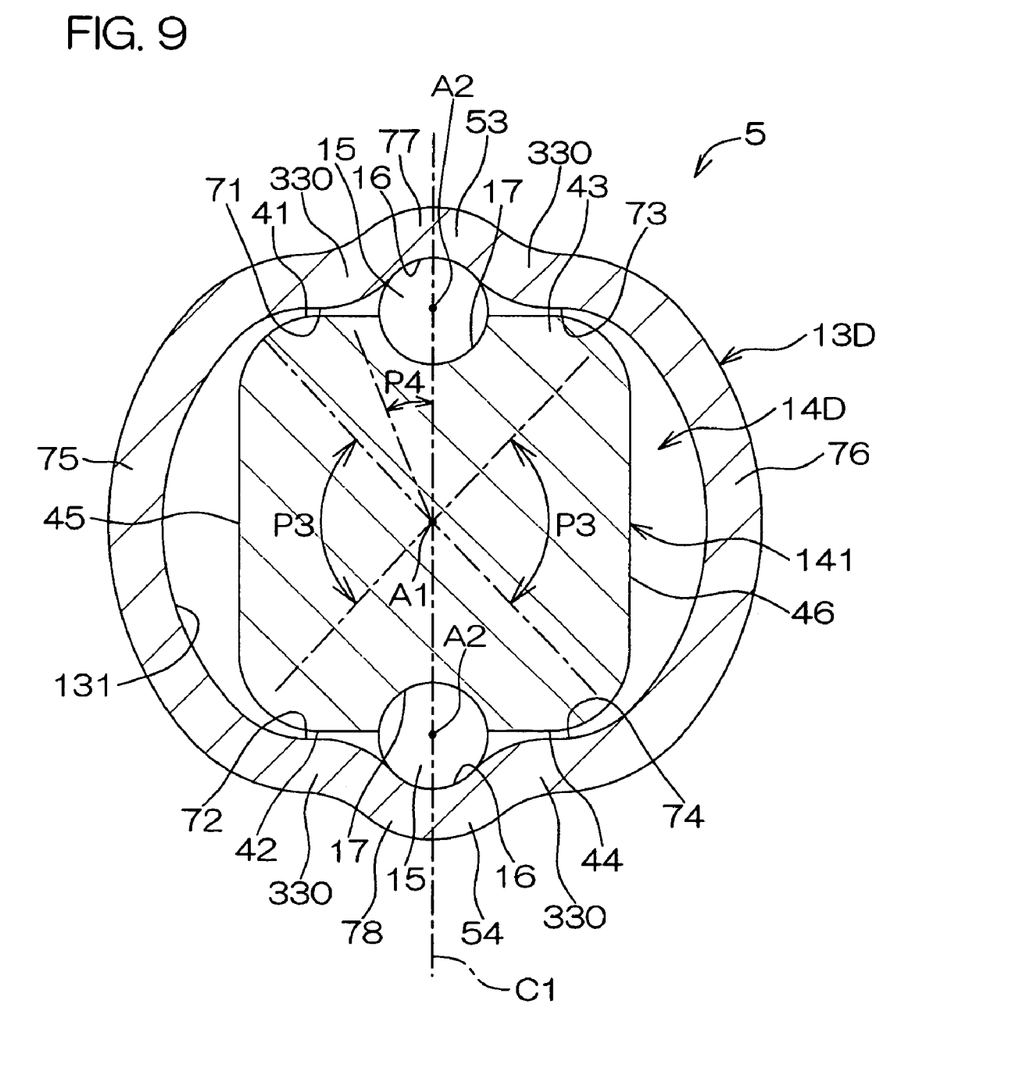
FIG. 9 is a cross section of an expandable shaft according to still another embodiment of the invention.

FIG. 9 shows still another embodiment of the invention. Referring to FIG. 9, this embodiment is characterized in the following. An outer shaft 13D comprises a tube having an even thickness over the entire periphery. The basic form of the outer shaft 13D is circular in cross section. The basic form of an inner shaft 14D is rectangular in cross section.

An outer peripheral surface 141 of the inner shaft 14D has a first pair of opposing flat portions 41 and 42, a second pair of opposing flat portions 43 and 44, and a third pair of opposing flat portions 45 and 46. A pair of raceway grooves 17 opposing across a cross sectional center of the inner shaft 14D is formed on the outer peripheral surface 141 of the inner shaft 14D. The flat portions 41 and 43 are disposed on the same plane. One of the raceway grooves 17 is disposed between the flat portions 41 and 43. The flat portions 42 and 44 are disposed on the same plane. The other raceway groove 17 is disposed between the flat portions 42 and 44.

A pair of raceway grooves 16 respectively opposing the raceway grooves 17 of the inner shaft 14D and limiting portions 71, 72, 73, 74 respectively opposing the flat portions 41, 42, 43, 44 across a space on an inner peripheral surface 131 of the outer shaft 13D. The outer shaft 13D has a pair of angular protrusions 53 and 54 protruding outward in the radius direction, and is provided with the raceway grooves 16 corresponding to concave portions defined inside of the protrusions 53 and 54.

The outer shaft 13D has a pair of opposing portions 75 and 76 that oppose each other. The pair of opposing portions 75 and 76 oppose the flat portions 45 and 46 of the inner shaft 14D, respectively. The pair of opposing portions 75 and 76 is a circular arc in cross section about a central axis line A1 of the outer shaft 13D. Bending portions 330 serving as deformation promoting portions are respectively formed between plane C1 including the central axis line A1 of the outer shaft 13D as well as centers of curvature A2 of the raceway grooves 16 of the outer shaft 13D and the limiting portions 71, 72, 73, 74 adjacent to the raceway grooves 16. The bending portions 330 are defined by protrusions that protrude inward in the radius direction so that part of the outer peripheral surface of the outer shaft 13D sinks in.

The outer shaft 13D has a pair of remaining portions 77 and 78 disposed between the pair of opposing portion 75 and 76 in the circumferential direction of the outer shaft 13D. One raceway groove 17 and the pair of limiting portions 71 and 73 are formed on an inner peripheral surface of one remaining portion 77. One raceway groove 16 is disposed between the pair of limiting portions 71 and 73. The other raceway groove 16 and the pair of limiting portions 72 and 74 are formed on an inner peripheral surface of the other remaining portion 78. The other raceway groove 16 is disposed between the pair of limiting portions 72 and 74.

The raceway grooves 16, the bending portions 330, the limiting portions 71 to 74, and the opposing portions 75 and 76 are formed so that they are smoothly continuous by a curve having a larger radius of curvature than the thickness of the outer shaft 13D. Tops of protrusions 53, 54 of the outer shaft 13D are preferably disposed on a circumference including the outer circumference of the opposing portions 75 and 76.

According to this embodiment, the limiting portions 71 to 74 are disposed adjacent to the raceway grooves 16. The remaining portions except the raceway grooves 16 and the limiting portions adjacent to both sides of the raceway grooves 16 are defined as the pair of opposing portions 75 and 76 forming a circular arc about the central axis line A1 to be a large region in the circumferential direction of the outer shaft 13D. Therefore, large amount of torsion in the direction of rotation of the outer shaft 13D can be secured.

Specifically, a central angle P3 of the outer shaft 13D corresponding to the opposing portions 75 and 76 is set in a range from 70 degrees to 110 degrees. The central angle P3 is set at 70 degrees or above to secure enough torsional strength of the outer shaft 13D. The central angle P3 is set at 110 degrees or below in order to secure a space for disposing the raceway grooves 16 and the limiting portions 71 to 74 in the remaining portions 77 and 78.

A central angle P4 of the outer shaft 13D corresponding to the region between the plane C1 including the central axis line A2 of the outer shaft 13D as well as the center of curvature A2 of the raceway grooves 16 and the limiting portions 71 to 74 respectively adjacent to the raceway grooves 16 is set within a range from 15 degrees to 25 degrees.

As mentioned above, the opposing portions 75 and 76 formed in a circular arc so as to secure a large amount of torsion are made smoothly continuous to the limiting portions 71 to 74 to ease concentration of stress at the raceway grooves 16 and the limiting portions 71 to 74. As a result, strength and stability of the outer shaft 13D are improved.

Even if all the balls 15 fall off from the raceway grooves 16 and 17, engagement between the flat portions 41 to 44 and the limiting portions 71 to 74 enables torque to be transmitted between both shafts 13D and 14D. Therefore, the steering system can be ensured.

In the inner shaft 14D, the flat portions 41 to 44 for controlling the rotation of the shafts 13D and 14D are disposed adjacent to the raceway grooves 17, thereby making it possible to decrease the thickness of the inner shaft 14D. Consequently, the inner shaft 14D can be decreased in weight.

Figure 10:
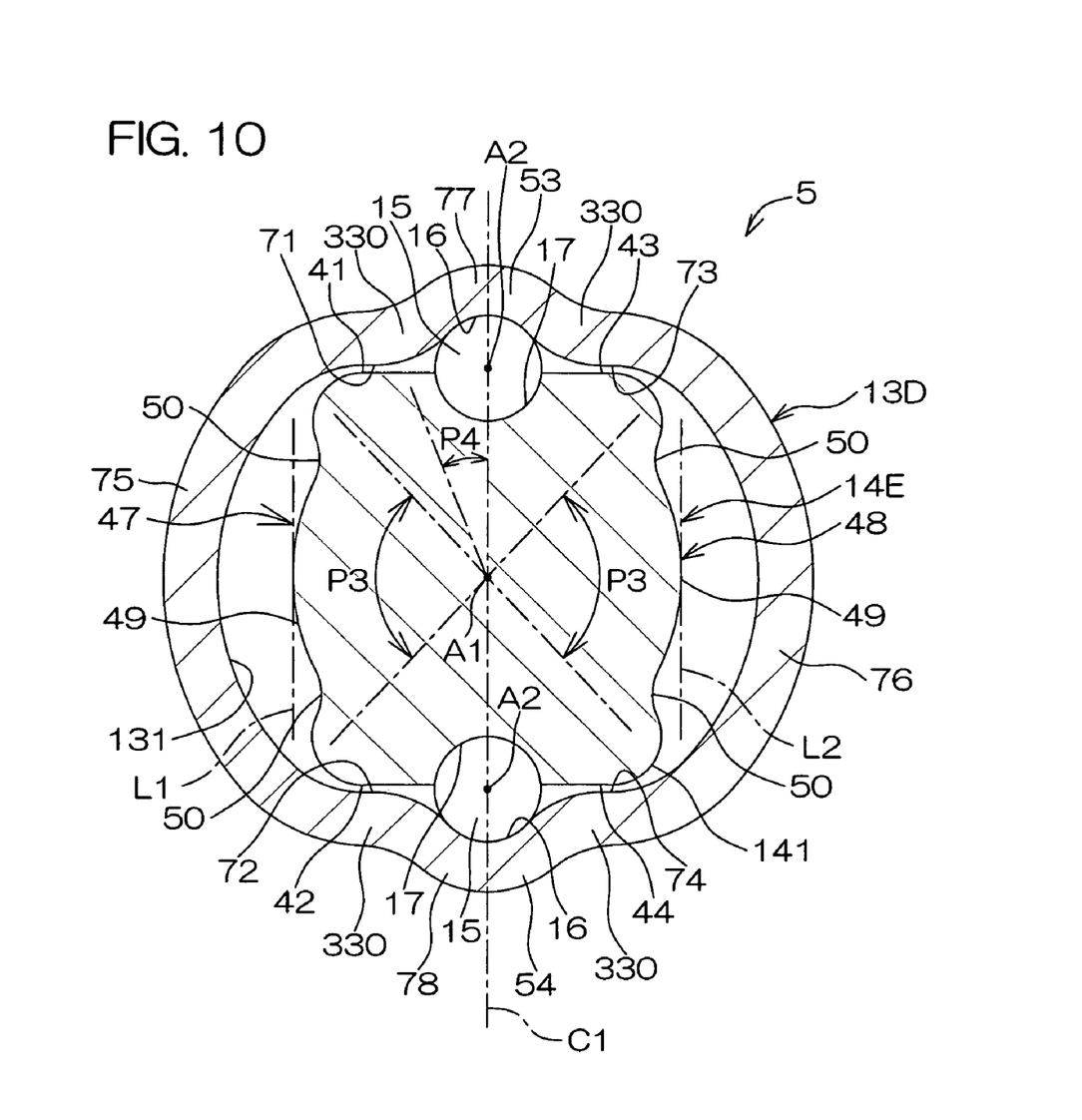
FIG. 10 is a schematic cross section of a major portion of an expandable shaft according to still another embodiment of the invention.

FIG. 10 illustrates still another embodiment of the invention. Referring to FIG. 10, this embodiment is different from the embodiment of FIG. 9 in that undulating portions 47 and 48 are disposed in stead of the third pair of flat portions 45 and 46 to decrease the thickness of the inner shaft 14D. In FIG. 10, lines L1 and L2 denoted by dashed lines are equivalent to the positions of the flat portions 45 and 46 according to the embodiment of FIG. 9.

A projection 49 and a pair of recesses 50 are formed in the undulating portions 47 and 48 as extending along the axis of an inner shaft 14E. The outline of the projection 49 is a circle along a circumference about the central axis line A1 of the outer shaft 13D, whereby torsional strength of the inner shaft 14E is secured. The recesses 50 are gently curved in cross section.

According to this embodiment, the inner shaft 14E can be reduced in weight while its torsional strength is secured. Consequently, the intermediate shaft 5 as an expandable shaft can be reduced in weight.

Figure 11:
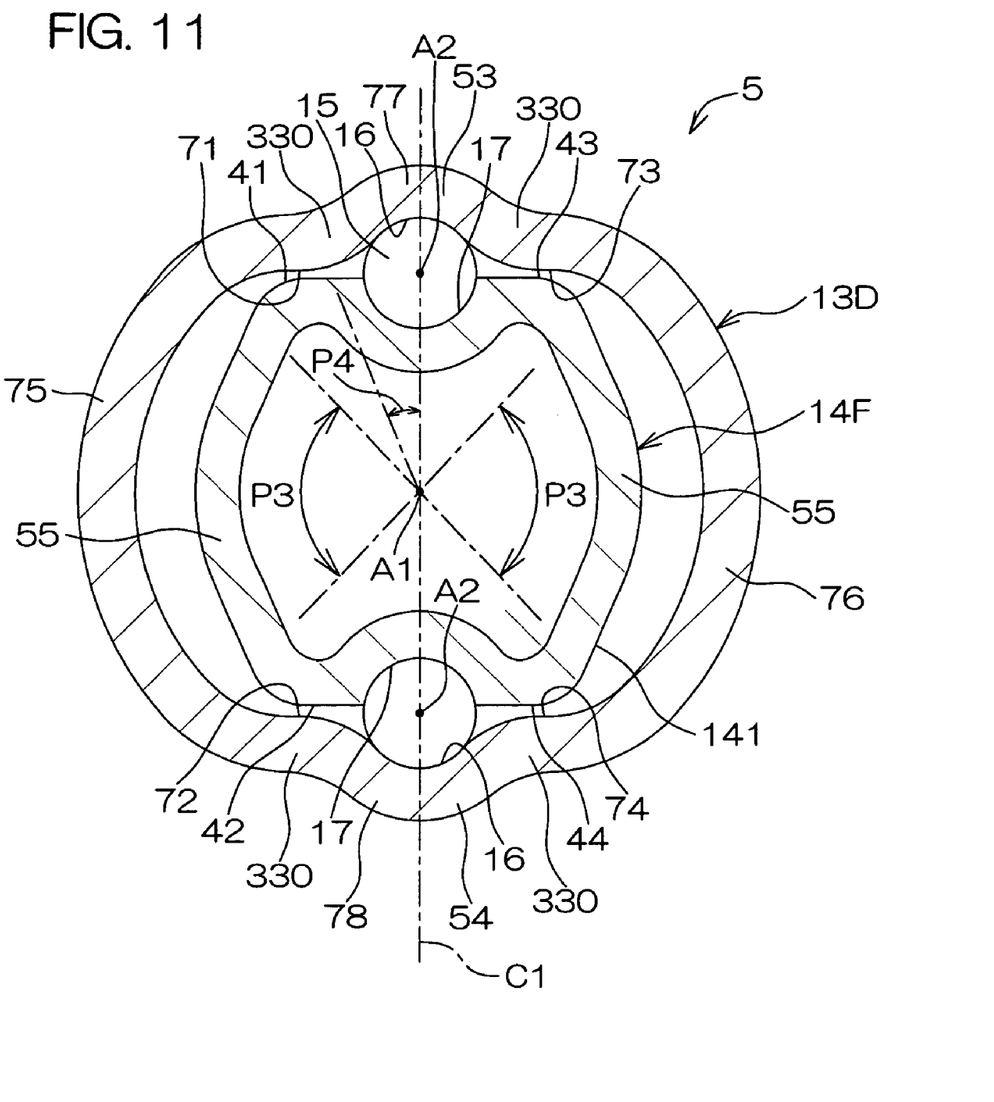
FIG. 11 is a cross section of an expandable shaft according to still another embodiment of the invention.

FIG. 11 illustrates still another embodiment of the invention. Referring to FIG. 11, this embodiment is different from the embodiment of FIG. 9 in that a tube is used as an inner shaft 14F to make it hollow in an attempt to reduce the weight of the inner shaft 14F. Further, bulging portions 55 projecting outward in radius direction to be in a gentle slope are formed instead of the third flat portions 45 and 46. This allows torsional strength of the inner shaft 14F of a tube to be equivalent to torsional strength of the solid inner shaft 14D according to the embodiment of FIG. 9.

According to this embodiment, the inner shaft 13F can be reduced in weight while its torsional strength is secured. Consequently, the intermediate shaft 56 as an expandable shaft can be reduced in weight.

Figure 12:
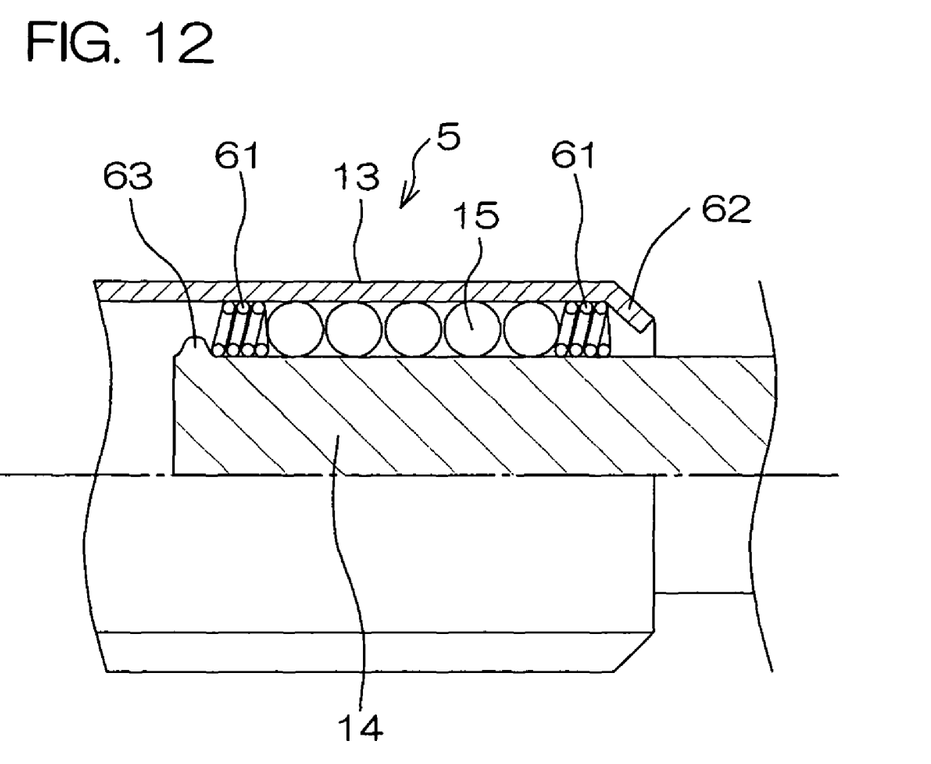
FIG. 12 is a cross section of an expandable shaft according to still another embodiment of the invention.

It should be appreciated that the invention is not limited to the embodiments above. In the respective embodiments above, as is shown in FIG. 12, balls alone may be used by omitting the holder, and the balls 15 are pushed from both sides using pushing members 61, such as compression coil springs, provided at the top and the bottom of the balls 15 in an array. In this case, plastic deformation portions 62 and 63 as ball fall-off preventing portions may be provided to the outer shaft 13 and the inner shaft 14, respectively, so that they function to prevent the balls 15 from falling off.

Figure 13:
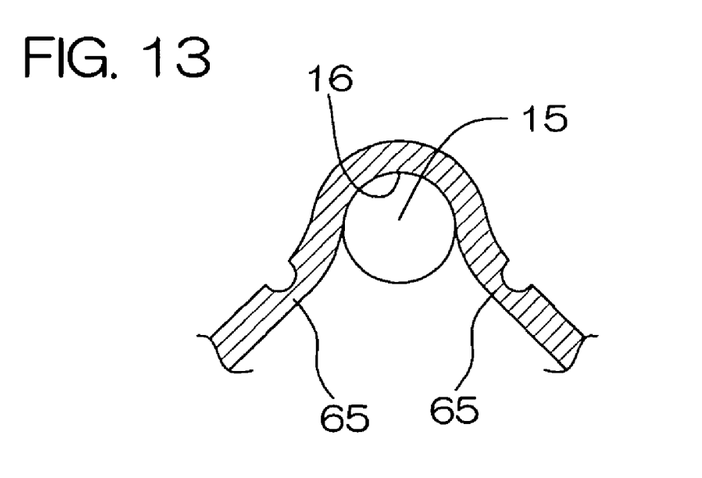
FIG. 13 is a cross section of an expandable shaft according to still another embodiment of the invention.

Also, in the respective embodiments above, as is shown in FIG. 13, thin portions 65 may be used as the deformation promoting portions. The bending portions may comprise the thin portions.

Also, in the respective embodiments above, it is preferable that the surface hardness of at least one of the outer shaft and the inner shaft is in a range from 400 to 550 Hv in the Vickers hardness. When the surface hardness is less than 400 Hv, because the surface hardness of the balls 15 is normally about 700 Hv, a difference in hardness is so large that impression readily occurs. When the surface hardness of at least one of the outer shaft and the inner shaft exceeds 550 Hv, the shaft may be bent due to thermal deformation during the curing. It is therefore preferable to set the surface hardness in the range specified above. It should be noted, however, that it is preferable to subject at least one of the outer shaft and the inner shaft to nitrization, because in such a case the surface hardness can be increased to about 700 Hv while suppressing thermal deformation.

Also, in the respective embodiments above, it is preferable that at least one of the outer shaft and the inner shaft is made of chromium steel or chrome molybdenum steel, because allowable stress can be increased and safety can be set high.

Also, in the respective embodiments above, it is preferable that at least one of the outer shaft and the inner shaft is made of refined materials (quenched and tempered materials), because allowable stress can be increased and safety can be set high.

While the invention has been described in detail by way of the concrete embodiments, it should be appreciated that modifications, changes, and equivalents readily occur to anyone skilled in the art who understands the content of the description above. The invention therefore includes the scope of the appended claims and the equivalents thereof.

This application is based upon and claims the benefit of priority from the prior Japanese Patent Application No. 2004-270148 filed with the Japanese Paten Office on Sep. 16, 2004, the entire disclosure of which is incorporated herein by reference.

The invention claimed is:

1. An expandable shaft comprising:
   an inner shaft having an outer peripheral surface and having a substantially rectangular cross section, at least one raceway groove being formed on the outer peripheral surface of the inner shaft to extend in an axial direction of the inner shaft, at least first and second flat portions disposed on the outer peripheral surface of the inner shaft, the at least first and second flat portions being oriented parallel to each other and having the at least one raceway groove of the inner shaft disposed thereon;
   a tubular outer shaft having an inner peripheral surface, a deformation promoting portion that promotes deformation of the outer shaft, a pair of opposing portions that oppose each other in a radial direction of the outer shaft, and a pair of remaining portions disposed between the pair of opposing portions in a circumferential direction of the outer shaft, the pair of opposing portions having a circular arc shape in cross section and abutting the central axis line of the outer shaft, the outer shaft surrounding the inner shaft;
   at least one raceway groove being formed on the inner surface of the outer shaft to oppose the raceway groove of the inner shaft and being formed on a respective inner peripheral surface of the remaining portions, the deformation promoting portion being placed in a specific region of the outer shaft in the circumferential direction between a plane including a center of curvature of the raceway groove of the outer shaft as well as a central axis line of the outer shaft and each limiting portion;
   plural rolling elements pinched elastically in a space between the raceway grooves of the inner shaft and the raceway grooves of the outer shaft by an elastic restoring force of the outer shaft in response to the deformation of the outer shaft, the plural rolling elements being aligned in an array along the raceway grooves in the axial direction;
   flat limiting portions formed on the inner peripheral surface of one of the remaining portions and on the inner peripheral surface of another one of the remaining portions, and disposed on the inner peripheral surface of the outer shaft and oriented parallel to each other, the limiting portions limiting relative rotation between the inner shaft and the outer shaft by engaging, respectively, with the corresponding flat portions.

2. The expandable shaft according to claim 1, wherein a central angle of the outer shaft between outer ends of the pair of opposing portions and having a vertex at a center of the outer shaft in the radial direction, is in a range from 70 degrees to 110 degrees.

3. The expandable shaft according claim 2, wherein a central angle of the outer shaft corresponding to the specific region, measured from a center line through centers of the plural rolling elements disposed on opposite sides of the inner shaft, and having a vertex at a center of the outer shaft in the radial direction, is in a range from 15 degrees to 25 degrees.

4. The expandable shaft according to claim 1, wherein the outer peripheral surface of the inner shaft includes an undulating portion disposed between the flat portions, and the undulating portion includes a recess.

5. The expandable shaft according to claim 1, wherein
   the inner shaft is a tube,
   the outer peripheral surface of the inner shaft includes a bulging portion projecting outward in the radial direction, the bulging portion being disposed between the flat portions.

* * * * *